J. H. VINTON & M. E. FITZPATRICK.
Garter.

No. 199,240. Patented Jan. 15, 1878.

WITNESSES
Sam¹ R. Turner
R. H. Lacey

INVENTORS
John H. Vinton
Michael E. Fitzpatrick
By R. S. & A. P. Lacey ATTORNEYS

UNITED STATES PATENT OFFICE.

JOHN H. VINTON AND MICHAEL E. FITZPATRICK, OF BRIDGEPORT, CONN., ASSIGNORS TO FRANK ARMSTRONG, OF SAME PLACE.

IMPROVEMENT IN GARTERS.

Specification forming part of Letters Patent No. 199,240, dated January 15, 1878; application filed November 7, 1877.

*To all whom it may concern:*

Be it known that we, JOHN H. VINTON and MICHAEL E. FITZPATRICK, of Bridgeport, in the county of Fairfield and State of Connecticut, have invented certain new and useful Improvements in Elastics for Garters, Belts, Bands, &c.; and we do hereby declare that the following is a full, clear, and exact description thereof, which will enable others skilled in the art to which it pertains to make and use the same, reference being had to the accompanying drawing, and to the letters of reference marked thereon, which form a part of this specification.

This invention has for its object to furnish a strong and substantial garter which cannot be injured by any ordinary stretching, and which possesses durability and lightness of weight and perfect ventilation.

It consists of two round coil-springs arranged and held at their ends by the clasp-plates, so as to leave a considerable space between them; in a check-band having its ends secured to the clasp-plates, and of suitable length to permit the necessary extension of the garter, and arranged between the springs; and in one or more supporting-bars placed between and secured to the springs for the purpose of holding the check-band; and in other improvements, all of which will be hereinafter fully explained.

Figure 1:
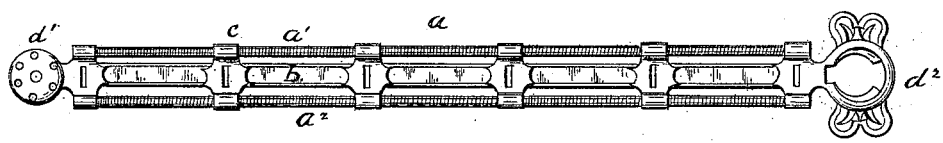
Figure 2:
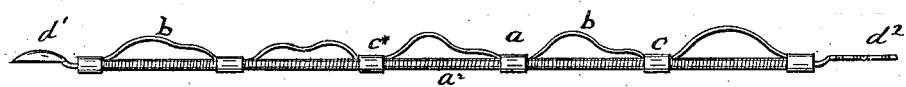
Figure 3:
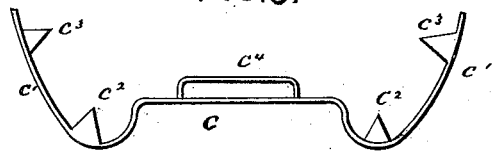

In the drawings, Figure 1 is a plan, and Fig. 2 is a side view, of a garter constructed according to our invention; and Figs. 3, 4, 5, and 6 are detail views.

Heretofore in the manufacture of wire-spring garters, in order to secure sufficient strength, it has been necessary to use a large wire and form it into a large flattened coil, thereby giving too great weight to the device, which not only caused increased expense in the manufacture, but which gave discomfort to the wearer.

In this device we are enabled to use a small wire formed into a small round coil, and secure a garter light, strong, and durable, and superior to similar devices of ordinary construction.

$a$ is the garter, composed of the two round coil-springs $a^1 a^2$, made of small wire, and arranged about the distance of one-half an inch apart, and which have their ends securely fastened to the clasp-plates, as shown. $b$ is the check-band, made of a suitable length to permit the necessary extension of the coil-springs. It may be of any desired width or form. It has its ends secured to the clasp-plates, and is arranged between the springs, as shown.

By arranging the springs and the band $b$ between them, as shown, we are enabled to employ a much stronger band than can be used in ordinary garters, and in case the band becomes detached or broken it can readily be attached or a new one substituted therefor by the wearer. Thus it will be seen that there is avoided the total loss of the garter when the check-band becomes worthless.

The smallness of the wire coils and the distance they are placed apart give a superior ventilation, and prevent any interlocking of the wires of the separate coils, or of the check-band with the coils.

$c$ is a supporting-bar. It is constructed with the extensions or wings $c^1 c^1$, on which are formed the spurs $c^2 c^3$. It is also provided with a loop, $c^4$, through which the band $b$ may be passed and secured by depressing said loop, as shown. The principal object of this bar is as a support and fastening for the band $b$. In applying it the wings $c^1 c^1$ are passed around the coil-springs, the spurs $c^2 c^3$ passing between the wires of the coil, as shown, and thereby securing the bar rigidly in position, so that it cannot slide back and forth on the coils. I prefer this kind of fastening by spurs, though the wings might be secured in position by any well-known means.

We employ one or more of these bars $c$, the number being such as may be most desirable to the manufacturer. We prefer to use a series of them, placing them from one to one and a half inches apart. By doing this and securing the band $b$ in equal sections between them, it will be seen that the coils can be extended only to such distance as the limit of the intermediate section of the band between any two adjoining bars will permit. We are, therefore, enabled to secure an entire extension of garter equal to the sum of the limited extensions between the series of bars, so that, while any given portion is limited in the degree of its extension, the entire garter is limited only by the entire length of the check-band.

By such construction it is not necessary, in applying the garter to the limb, to use extraordinary care to always catch and draw by the clasps. If caught at an intermediate point, the sections of the band limit the extension, and the coil cannot be injured by too great extension or strain on any given point.

Figure 5:
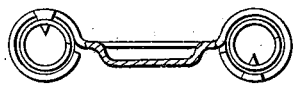
Figure 6:
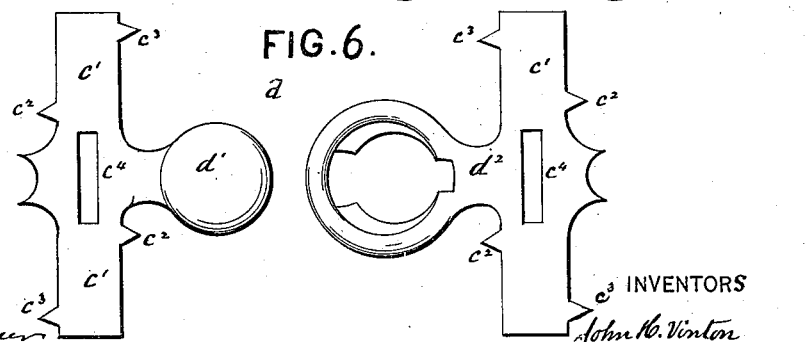

$d$ is the clasp, composed of the male and female plates $d^1$ $d^2$, which are formed with the extensions or wings $c^1$ $c^1$, spurs $c^2$ $c^3$, and loop $c^4$, corresponding to the similar parts on the bars $c$. The wings $c^1$ $c^1$ are passed around on the outside of the coil-springs $a^1$ $a^2$. The spurs $c^2$ $c^3$ pass between the wires, and thereby is made a simple, strong, and substantial fastening for the spring, as shown in Fig. 5.

Figure 4:
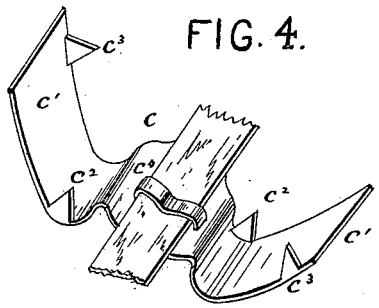

The ends of the band $b$ are secured in the loops $c^4$ by depressing the latter, as shown in Fig. 4.

In this device, when provided with the crossbars $c$, fixed rigidly to the coils, as described, it will be understood that there can be no slipping of the wires through the loops or rings formed by the wings $c^1$ $c^1$, and that by reason of this firmness in position the coils cannot be drawn into ill shape or broken, as is so frequently the case in garters of ordinary construction.

We do not confine ourselves to the use of the loop $c^4$ for holding the check-band to the bar $c$. It will be readily understood that the band may be secured by a rivet passed through the bar, or by ears formed on the outer edge of the bar and turned over so as to embrace its edges, or by any other suitable fastening.

Having described our invention, what we claim, and desire to secure by Letters Patent, is—

1. The bar $c$, having the extensions $c^1$ $c^1$, with spurs $c^2$ $c^3$, constructed and arranged to operate as set forth.

2. The bar $c$, constructed to support and hold the springs $a^1$ $a^2$, with an intervening space, as described, and having a fastening, $c^4$, for securing the check-band $b$ externally to and between said springs, substantially as set forth.

3. In a coil-spring garter, the check-band $b$, secured to the clasps $d^1$ $d^2$ and detached from and arranged between the adjoining springs, substantially as set forth.

4. The clasp $d$, constructed with the plates or bars $d^1$ $d^2$, having the extensions $c^1$ $c^1$ and spurs $c^2$ $c^3$, and adapted to be applied around the ends of the adjoining springs, and provided with suitable means for holding the ends of the check-band, substantially as set forth.

5. A garter composed of two round coil-wire springs having their ends secured to the clasp-plates, so as to provide an intermediate space throughout their entire length, and provided with one or more intermediate check-band supporters, substantially as described.

In testimony that we claim the foregoing as our own we affix our signatures in presence of two witnesses.

JOHN H. VINTON.
MICHAEL E. FITZPATRICK.

Witnesses:
PERRY B. TURPIN,
WM. A. PITTENGER.